(12) United States Patent
Kopacz et al.

(10) Patent No.: US 8,276,283 B1
(45) Date of Patent: Oct. 2, 2012

(54) RETICLE ETCHED WITHIN OPTICAL LENS

(75) Inventors: Stanley P. Kopacz, E. Stroudsburg, PA (US); Kimberly A. Griswold, Bloomfield, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 339 days.

(21) Appl. No.: 12/762,512

(22) Filed: Apr. 19, 2010

(51) Int. Cl.
*F41G 1/00* (2006.01)

(52) U.S. Cl. .......................................... 33/297; 33/298

(58) Field of Classification Search .................. 33/297, 33/298, 265
See application file for complete search history.

(56) References Cited

U.S. PATENT DOCUMENTS

| | | | | |
|---|---|---|---|---|
| 3,999,301 A * | 12/1976 | Hunt et al. | ...... | 33/297 |
| 4,042,449 A * | 8/1977 | Hunt et al. | ...... | 216/26 |
| 4,178,404 A * | 12/1979 | Allen et al. | ...... | 33/297 |
| 4,912,853 A * | 4/1990 | McDonnell et al. | ...... | 33/228 |
| 4,981,331 A * | 1/1991 | Taylor | ...... | 359/896 |
| 5,161,062 A * | 11/1992 | Shafer et al. | ...... | 359/785 |
| 5,164,794 A * | 11/1992 | Markle | ...... | 356/394 |
| 5,414,557 A * | 5/1995 | Phillips | ...... | 359/428 |
| 5,629,767 A * | 5/1997 | Tchejeyan | ...... | 33/348 |
| 6,031,604 A * | 2/2000 | Pniel | ...... | 356/124 |
| 2003/0086165 A1* | 5/2003 | Cross et al. | ...... | 359/424 |
| 2012/0097741 A1* | 4/2012 | Karcher | ...... | 235/404 |

* cited by examiner

*Primary Examiner* — Yaritza Guadalupe-McCall
(74) *Attorney, Agent, or Firm* — Henry S. Goldfine

(57) ABSTRACT

A reticle which does not emit a retro-reflective signature detectable using standard field detection means at the standard distance of 10 miles, which reticle is formed of a precise series of about 10 micron wide lines etched within a physically light weight, single optical blank or glass lens, using a femtosecond near IR wavelength pulsed laser.

8 Claims, No Drawings

RETICLE ETCHED WITHIN OPTICAL LENS

FEDERAL RESEARCH STATEMENT

The inventions described herein may be manufactured, used and licensed by, or for, the U.S. Government, for U.S. Government purposes.

BACKGROUND OF INVENTION

1. Field of the Invention

The present invention relates to optical weapon sight reticles, and more particularly, to such reticles which exhibiting minimal retroflection therefrom.

2. Background Art

Optical sighting and observation devices used in military applications, such as a tank gun sight, frequently possess "cat's eye" reflection or "retro-reflection" characteristics. That is, light incident on the device is reflected from one or more lens, mirror, prism or other optical surfaces and redirected out of the device in exactly the direction from which it came. Thus, particularly in a night environment, the sighting device may effectively act as a beacon, transmitting light back to an enemy indicating the position of the optical sight and its user. The adverse consequences of revealing the user's position in this manner are readily apparent. Hence, a formidable objective in designing and constructing military sighting devices is to eliminate any retro-reflection characteristics.

Although all optical surfaces within a given optical system may contribute to retro-reflection, some optical elements contribute more prominently to retro-reflection than other optical elements. The optical element addressed herein is the optical reticle. The optical reticle is the cross-hair optical element provided in the focal plane as a sighting reference. The optical reticle usually consists of a plano-plano polished glass element with fine lines or grooves etched therein and filled with a diffusely reflecting solid such as titanium dioxide. When the reticle is illuminated from the side, preferably with an appropriate red illumination when used at night, the solid material stands out and serves as a highly visible reference for the user. Unfortunately, however, the reticle is a large contributor to the retro-reflection and, hence, the optical "signature" of any given optical sighting device. This is due to the fact that light rays collected by the sighting device and incident upon the polished surface of the reticle are redirected back through the optical system toward the source, i.e. the enemy, without any reduction in intensity due to angular dispersion effects.

One method used to minimize such retro-reflective signature from military reticles is commonly known as the sandwich cemented reticle, which involves cementing a glass cover plate to the reticle. Therefore, sandwich cemented reticles involve three optical media: the reticle substrate, the adjacent cover plate, and an optical cement between two reticle substrate and cover plate. Thus, the indices of refraction for all three optical media must be identical in order for the reflectance R to approach zero. Otherwise, the sum of the reflections at the cover plate to cement interface and the cement to reticle interface will be appreciable. The solution to this matching problem has proven elusive. Indeed, aging, humidity, temperature, infra-red exposure and numerous other potential problems may affect optical stability and over time and destroy what had been believed to be ideal optical matching conditions. In particular, such effects over time can alter the properties, including index of refraction of the optical cement. Furthermore, it is difficult to obtain appropriate optical quality glass and cement having identical indices of refraction. Some optical cements are specially prepared to match reticle substrate and cover plate refractive indices, but such cements do not provide sufficient refractive index control to yield the desired degree of reflection suppression.

A second method, disclosed in U.S. Pat. No. 4,981,331, discloses also use of two flat lens surfaces similar to the sandwich cemented reticle; however these surfaces are highly polished and adhere to each other without any cement therebetween, i.e. a polished flat optical cover glass contacted to a polished flat reticle substrate. However, the polished flat optical covered glass and polished flat reticle substrate disclosed in U.S. Pat. No. 4,981,331, still emits a relatively significant retro-reflective signature, due in significant part to the size and edge characteristics of the chemically etched reticle, and has other issues, such as physical stability in field conditions—where the combination is subjected to significant shock, variations in altitude/pressure, and extremes of temperature. Plus, this marriage of two flat lens, exhibits a parallax effect along the edge thereof. And finally, the chemical process for etching fine reticle lines is expensive, as are the two highly polished glass lens.

There is a need in the art for a method to create an economical reticle that does not require a complex and expensive construction, that can utilize curved lens glass so as to reduce parallax at the edge thereof, and that will minimize any retro reflective signature.

These and other highly desirable and unusual results are accomplished by the present invention in a compact structure which can achieve a high degree of reflection suppression on a repeatable basis.

SUMMARY OF INVENTION

The present invention provides a simple, economical reticle, which is etched within a physically light, single optical blank or glass lens, which lens is from about 10 to about 25 mm in diameter; the reticle is formed of about 10 micron wide lines within the single glass lens, at a depth therein of about 3 to about 5 mm—from which reticle a retro-reflective signature would not be detectable using standard field detection means at the standard distance of 10 miles. Further, the reticle need not be placed in a flat lens substrate; but, can be etched within a curved lens glass, thereby reducing parallax at the edge of the field of view (FOV) to produce significantly better image quality and accuracy.

In an alternate embodiment, the reticle can be etched anywhere in the optical train of the gun sight, even within a prism, thereby further reducing the number of parts, weight, and cost of the sight. This ability to place the reticle anywhere in the optical system allows for reduced complexity and increased freedom in design of optical systems.

The about 10 micron wide lines that form the reticle of the subject invention can be etched within the optical glass lens by using a pulsed laser with a wavelength of about 800 nanometers and a temporal pulse width of about 100 femtoseconds (fs). The laser beam being divided by a split-beam prism and the two resulting beams guided to form the desired sharp edged (i.e. free of micro-cracks and micro-fissures), about 10 micron wide reticle line.

Further features and advantages of the present invention will be set forth in, or apparent from, the detailed description of preferred embodiments thereof which follows.

DETAILED DESCRIPTION OF THE INVENTION

The reticle of the present invention is formed of about 10 micron wide lines which are of a quality such that there are little to no micro-cracks, or micro-fissures, or molten debris, within the optical glass about the edges of the lines—a quality not present within the prior art, where the applications did not demand such quality and tight tolerances. Such tight tolerances on the quality of the created lines are mandatory to realize the reduction of retroreflectivity. Such quality reticle lines are created by using an ultrashort or femtosecond pulse duration laser, the ultrashort duration of whose beam eliminates thermal effects which are responsible for such features as micro-cracks and molten debris. The wavelength range of this pulse laser is at the lower portion of the near IR range at about 800 nm, preferably from about 0.75 μm to about 0.85 μm.

The particular ablation effects in the optical glass caused by this femtosecond pulse duration laser process provides a diffuse pattern about the etched line, which caused the refracted light traveling through the reticle to be diverted away from the acceptance cone angle of the eye, as one's eye observes the reticle through the eyepiece lens of the sight or scope. As a result, the reticle will look black to the user, providing maximum contrast in the application of the reticle. Further, considering this diffuse pattern, as well as, the precision of the etched line itself, the incident light from the objective side will not be refracted back, but rather refracted toward the walls of the sight or scope, thereby minimizing any return signature. Finally, the reticle of the present invention, will also allow the standard process of side illumination to facilitate use of the subject reticle at night; the incident illumination will be caught inside the reticle due to the total internal reflection (TIR), due to the angle of incidence of the side illumination relative to the angle of ablation.

In the present invention, the subject femtosecond pulsed laser beam is directed to a beam splitter and the two separate beams are then concentrated, coincidentally along the target line within the optical bank or lens within which the reticle is being created. Such beam splitting, glass etching process must be exact and the use of a computer controlled system for controlling multiple beam splitting is disclosed in U.S. Pat. No. 7,482,568, which is incorporated herein in its entirety by reference.

U.S. Pat. Pub. No. 2006/0207976 discloses micromachining with femtosecond pulses; however, this disclosure requires the use of visible wavelengths versus near IR—stating that the optical objectives used to focus the pulses have a greater insertion loss and beam aberration when using near IR. Regardless, the disclosure of this patent publication details particular femtosecond pulse laser systems and manufactures, such as IMRA America, which can be adapted to the near IR/femtosecond requirements of the subject invention and the disclosure of U.S. Pat. Pub. No. 2006/0207976 is incorporated herein in its entirety by reference. Specifically, IMRA America, located in Ann Arbor, Mich., produces a Femtolite Ultra series ultracompact, economical laser that can deliver femtosecond pulses at 780 nm or 800 nm—meeting the requirements of the subject invention.

Although the invention has been described above in relation to preferred embodiments thereof, it will be understood by those skilled in the art that variations and modifications can be effected in these preferred embodiments without departing from the scope and spirit of the invention.

What is claimed is:

1. An optical reticle consisting essentially of a single optical lens internal to which are a reticle formed of a plurality of about 10 micron wide lines, from which reticle a retro-reflective signature would not be detectable using standard field detection means at a distance of 10 miles.

2. The optical reticle of claim 1, wherein the sides of said single optical lens are curved.

3. The optical reticle of claim 1, wherein said single optical lens is from about 10 to about 25 mm in diameter.

4. The optical reticle of claim 3, wherein said about 10 micron wide lines are at a depth within said single lens of about 3 to about 5 mm.

5. A method of making an optical reticle comprising the step of:
   (i) providing a single optical lens blank;
   (ii) providing a laser beam splitter;
   (iii) providing a series of alignment mirrors;
   (iv) providing a laser beam formed of a series of femtosecond pulses at a near IR wavelength;
   (v) dividing the subject laser beam using the beam splitter and realigning the split beams using the aligned mirrors, to direct the realigned beams back together so as to be coincident within the body of the single optical lens blank;
   (vi) moving the subject coincident beams in such as pattern so as to form a plurality of about 10 micron target lines within the single optical lens blank;
   (vii) whereby the target lines form the reticle;
   (viii) which reticle does not emit a retro-reflective signature detectable using standard field detection means at a distance of 10 miles.

6. The method of claim 5, wherein a computer is used to direct the realigned split beams back together, to be coincident within the body of the single optical lens blank, and to move the subject coincident beams to form the reticle.

7. The method of claim 5, wherein the near IR wavelength of the laser beam is from about 0.75 μm to about 0.85 μm.

8. The method of claim 5, wherein the femtosecond pulses have a temporal pulse width of about 100 femtoseconds.

\* \* \* \* \*